No. 725,164. PATENTED APR. 14, 1903.
R. T. SMITH & D. M. MONROE.
HORN FOR SOLDERING THE SIDE SEAMS OF SHEET METAL BODIES.
APPLICATION FILED JULY 31, 1901. RENEWED OCT. 21, 1902.
NO MODEL.
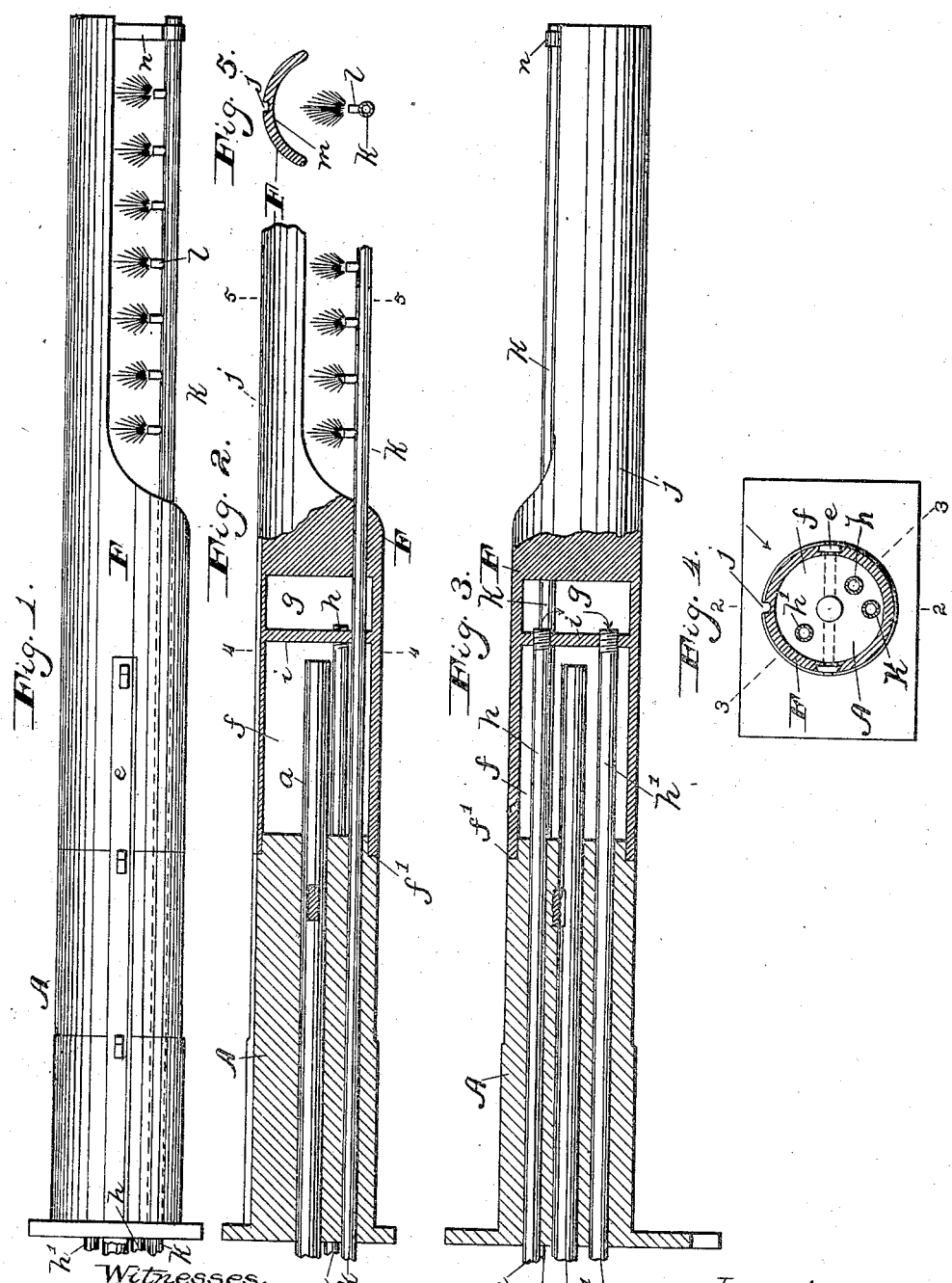
Witnesses.
Inventors.
Robert Tynes Smith
David M. Monroe
By Chas. B. Mann
Attorney.

UNITED STATES PATENT OFFICE.

ROBERT TYNES SMITH AND DAVID M. MONROE, OF BALTIMORE, MARYLAND, ASSIGNORS TO AMERICAN CAN COMPANY, A CORPORATION OF NEW JERSEY.

HORN FOR SOLDERING THE SIDE SEAMS OF SHEET-METAL BODIES.

SPECIFICATION forming part of Letters Patent No. 725,164, dated April 14, 1903.

Application filed July 31, 1901. Renewed October 21, 1902. Serial No. 128,201. (No model.)

*To all whom it may concern:*

Be it known that we, ROBERT TYNES SMITH and DAVID M. MONROE, citizens of the United States, residing at Baltimore, in the State of Maryland, have invented certain new and useful Improvements in Horns for Soldering the Side Seams of Sheet-Metal Bodies, of which the following is a specification.

This invention relates to an improved horn and mandrel for soldering the side seams of sheet-metal bodies, and the invention is especially adapted to be used in machines for forming the side seam and sizing the body previous to applying the flux and solder thereto. In devices of this character it is of great importance that the soldering-horn be hot, whereas the mandrel to which it may be attached should be comparatively cool and not be affected materially by the heat from the horn, for the reason that a hot mandrel by expanding the sheet-metal body would interfere with the accurate sizing of such body.

This invention, therefore, has for one of its objects to provide a heat-insulating water-chamber for a soldering-machine of such construction that while the soldering-horn is hot the heat thereof will not be transmitted to the mandrel.

With this and other objects in view the invention is illustrated in the accompanying drawings, in which—

Figure 1 is a side elevation of the soldering-horn, which in the present instance is illustrated as being attached to the end of a mandrel of a lock-seaming machine. Fig. 2 is a vertical longitudinal section through the mandrel and the inner end of the horn. Fig. 3 is a similar section of the mandrel and horn on the line 3 3 of Fig. 4 looking in the direction shown by dart. Fig. 4 is a vertical section through the inner end of the horn on the line 4 4 of Fig. 2. Fig. 5 is a vertical section through the horn on the line 5 5 of Fig. 2.

The invention consists in the combination, with the mandrel of a can-body forming or seaming machine, of a horn on which the seam is soldered and a heat-insulating chamber interposed between the mandrel and horn to prevent the heat from the soldering-horn being injuriously communicated to the body forming or seaming mandrel. The heat-insulator is preferably a hollow chamber through which water or other fluid may be circulated.

Referring to the drawings by letters, A designates a mandrel of a seaming-machine, which may be of any desired construction, but by preference is provided with a central rod $a$, which may be reciprocated by any suitable mechanism. Suitable means $e$ is to be employed and operated by the reciprocating rod $a$ to advance the sheet-metal bodies along the mandrel and feed them onto the horn to be soldered.

The mechanism thus far mentioned is the subject-matter of a separate application and is therefore not to be claimed herein, but is merely referred to for the purpose of more clearly understanding the invention.

The soldering portion of the horn F is concavo-convex, and the convex surface is in alinement with the top surface of the mandrel. A water-chamber to insulate the heat from the mandrel is interposed between the soldering portion of the horn and said mandrel. In the present instance a dry chamber $f$ is provided to receive the end of the reciprocating rod $a$. The water space or chamber $g$, which serves as a heat-insulator, is separated from said dry chamber by a partition $i$, and two water-tubes $h$ $h'$ pass entirely through the mandrel and the dry chamber $f$ and are screwed into the partition and open into the water-chamber. Besides serving for the circulation of water, these tubes also serve as bolts to hold the soldering-horn in alinement with the mandrel A. A longitudinal groove $j$ extends along the convex top surface of the horn and receives the side seam of the sheet-metal body as it is moved along or advanced, and said groove serves to keep the sheet-metal body from turning as it is advanced. A gas-conducting tube K extends longitudinally through the mandrel and also through the chambers $f$ and $g$ in the horn, and said tube projects beneath the concave side of said horn and is provided with a series of nipples or gas-burners $l$, which when lighted direct the flames against the concaved bottom $m$ of the horn and heat the same. A bracket $n$ at the end of the horn serves to support the projecting end of the gas-tube K.

The operation is simple and as follows: The sheet-metal body is first wrapped around the mandrel A and the seam is formed. The rod $a$ is then moved forward by suitable mechanism, (not shown,) and the devices $e$ transfer said body from the mandrel onto the horn F. The groove $j$ on the top of the horn receives the seam of the sheet-metal body and prevents the body from turning on the mandrel as it is advanced in order that the seam may be presented upward to flux mechanism and solder mechanism, neither of which is shown, because they are not a part of the present invention. The end of the tube $h$, which projects into the water-chamber $g$ at the inner end of the mandrel, is connected to a water-supply, and the tube $h'$ is connected to a waste or discharge pipe. Cold water is fed continuously by the tube $h$ through the mandrel and also through the chamber $f$ and partition $i$ and is discharged into the water-chamber $g$. The tube $h'$ extends back through the mandrel and conducts the water from said chamber $g$ to a point of discharge. It will thus be seen that water is continually passing through one tube into the chamber $g$ and back through the other tube, thus completing the circulation. By this means it will be seen that a cold-water space is formed between the soldering portion of the horn and the mandrel, and thereby the heat of the horn is prevented from being conducted back to the mandrel.

By reference to Figs. 3 and 4 it will be seen that the tube $h$, which feeds the water into the chamber $g$, is near the bottom of said chamber, whereas the tube $h'$, which discharges the water from said chamber, is near the top of the chamber. By this construction it will be seen that the chamber will always be nearly filled with cold water.

Having thus described our invention, what we claim as new, and desire to secure by Letters Patent, is—

1. In a seaming and soldering device for sheet-metal bodies the combination of a mandrel on which the bodies are seamed; a horn on which the seam is soldered; and a liquid-chamber interposed between the mandrel and horn.

2. In a seaming and soldering device for sheet-metal bodies the combination of a mandrel on which the bodies are seamed; a horn in alinement with said mandrel on which the seam is to be soldered, said horn having a liquid-chamber and means for supplying said chamber with liquid and discharging it therefrom.

3. In a seaming and soldering device for sheet-metal bodies the combination of a mandrel on which the bodies are seamed; a horn on which the seam is soldered; a liquid-chamber interposed between the mandrel and horn; and a tube extending through the mandrel and in communication with said liquid-chamber for supplying liquid to said chamber.

4. In a seaming and soldering device for sheet-metal bodies the combination of a mandrel on which the bodies are seamed; a horn at the end of said mandrel on which the seam is soldered, said horn being provided with a liquid-chamber near the end of the mandrel and a plural number of tubes extending through the mandrel and communicating with the liquid-chamber whereby liquid may be both fed into and discharged from said chamber through the mandrel.

5. In a seaming and soldering device for sheet-metal bodies the combination of a mandrel on which the bodies are seamed; a horn on which the seam is soldered; a liquid-chamber interposed between the mandrel and horn; and a gas-tube extending through the mandrel and beneath the horn.

6. In a seaming and soldering device for sheet-metal bodies the combination of a mandrel on which the bodies are seamed; a horn on which the seams are soldered; a liquid-chamber in the horn near said mandrel; a feeding-tube extending through the mandrel and entering the liquid-chamber near its bottom; and a discharge-tube opening in the liquid-chamber above the feeding-tube whereby liquid may be fed into the chamber near the bottom and discharged near the top.

7. In a body forming or seaming and soldering device for sheet-metal bodies, the combination of a mandrel on which the bodies are formed or seamed, a horn on which the seam is soldered; and a heat-insulator device interposed between the mandrel and horn, substantially as specified.

In testimony whereof we affix our signatures in the presence of two witnesses.

ROBERT TYNES SMITH.
DAVID M. MONROE.

Witnesses:
CHARLES L. VIETSCH,
FREDERICK S. STITT.